US007749453B2

(12) United States Patent
Rannikko et al.

(10) Patent No.: US 7,749,453 B2
(45) Date of Patent: Jul. 6, 2010

(54) DEVICES, SYSTEMS, AND METHODS FOR THE CONTAINMENT AND USE OF LIQUID SOLUTIONS

(75) Inventors: Minna A. Rannikko, Millbury, MA (US); Thomas M. Pizza, Dracut, MA (US); Edelizete S. Pauplis, Winchendon, MA (US); Randy H. Byrd, Pepperell, MA (US)

(73) Assignee: Bionostics, Inc., Devens, MA (US)

( * ) Notice: Subject to any disclaimer, the term of this patent is extended or adjusted under 35 U.S.C. 154(b) by 49 days.

(21) Appl. No.: 11/756,716

(22) Filed: Jun. 1, 2007

(65) Prior Publication Data

US 2007/0274869 A1 Nov. 29, 2007

Related U.S. Application Data

(63) Continuation-in-part of application No. 11/121,592, filed on May 4, 2005, now abandoned.

(60) Provisional application No. 60/857,391, filed on Nov. 7, 2006.

(51) Int. Cl.
*B01L 3/00* (2006.01)
*G01N 31/22* (2006.01)

(52) U.S. Cl. ........................... 422/102; 422/58; 422/99; 436/8; 436/174

(58) Field of Classification Search ..................... 436/8, 436/14, 174, 169; 422/56, 58, 61, 99, 102
See application file for complete search history.

(56) References Cited

U.S. PATENT DOCUMENTS 3,184,149 A * 5/1965 Repko ........................ 383/203
D284,215 S 6/1986 Sherwin et al.
4,678,754 A * 7/1987 Hoskins ....................... 436/15
5,172,854 A * 12/1992 Epstein et al. ........... 229/123.3
D333,262 S 2/1993 Zogg
5,542,236 A 8/1996 Miller
5,780,302 A 7/1998 Conlon et al.

(Continued)

FOREIGN PATENT DOCUMENTS

WO 2002/100265 * 12/2002

OTHER PUBLICATIONS

International Search Report of corresponding PCT Application No. PCT/US2008/65209.

(Continued)

*Primary Examiner*—Maureen M Wallenhorst
(74) *Attorney, Agent, or Firm*—McDermott Will & Emery LLP

(57) ABSTRACT

Disclosed are embodiments of a containment device having a flexible first layer and a flexible second layer sealed together to form a hermetically sealed reservoir. The surface area of contact between the first and the second layers can define a frame about the perimeter of the reservoir. The containment device can also include a porous pad located within the reservoir, and a liquid control solution configured to mimic a physiological fluid contained within the porous pad within the reservoir. The containment device can include a third flexible layer presenting a liquid holding surface for a user. A portion of the first and/or second layers can function as a frangible seal that is configured to be torn away by a user.

23 Claims, 12 Drawing Sheets

U.S. PATENT DOCUMENTS

| | | | | |
|---|---|---|---|---|
| D400,246 | S | 10/1998 | Niedospial et al. | |
| 5,881,879 | A | 3/1999 | Faict et al. | |
| D420,452 | S | 2/2000 | Cardy | |
| D421,307 | S | 2/2000 | Harmanoglu | |
| D430,303 | S | 8/2000 | Cipkowski | |
| 6,221,625 | B1 * | 4/2001 | Ashihara et al. | 435/7.9 |
| D443,695 | S | 6/2001 | Heitz et al. | |
| D456,910 | S | 5/2002 | Clark et al. | |
| 6,451,606 | B1 | 9/2002 | Konig et al. | |
| D477,670 | S | 7/2003 | Jurik et al. | |
| 6,638,249 | B1 * | 10/2003 | Lal et al. | 604/151 |
| 6,688,467 | B2 * | 2/2004 | Krupka et al. | 206/469 |
| D491,276 | S | 6/2004 | Langille | |
| 6,887,709 | B2 | 5/2005 | Leong | |
| D512,512 | S | 12/2005 | Bell et al. | |
| 7,001,344 | B2 | 2/2006 | Freeman et al. | |
| D558,357 | S * | 12/2007 | Byrd et al. | D24/224 |
| D571,928 | S * | 6/2008 | Rannikko et al. | D24/225 |
| 2001/0008614 | A1 | 7/2001 | Aronowitz | |
| 2002/0002344 | A1 | 1/2002 | Douglas et al. | |
| 2002/0078947 | A1 | 6/2002 | Gumaste | |
| 2002/0103499 | A1 | 8/2002 | Perez et al. | |
| 2002/0169394 | A1 | 11/2002 | Eppestein et al. | |
| 2003/0083685 | A1 | 5/2003 | Freeman et al. | |
| 2003/0211616 | A1 * | 11/2003 | Leong | 436/8 |
| 2007/0274869 | A1 | 11/2007 | Rannikko et al. | |
| 2008/0135559 | A1 * | 6/2008 | Byrd | 220/506 |

OTHER PUBLICATIONS

Written Opinion of corresponding PCT Application No. PCT/US2008/65209.

* cited by examiner

FIG. 21A
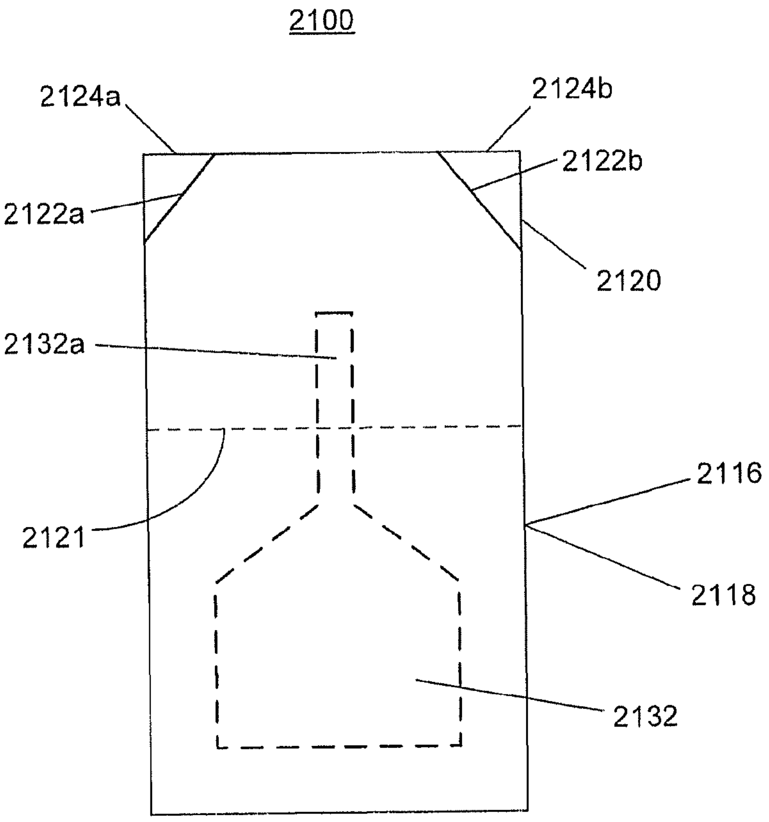
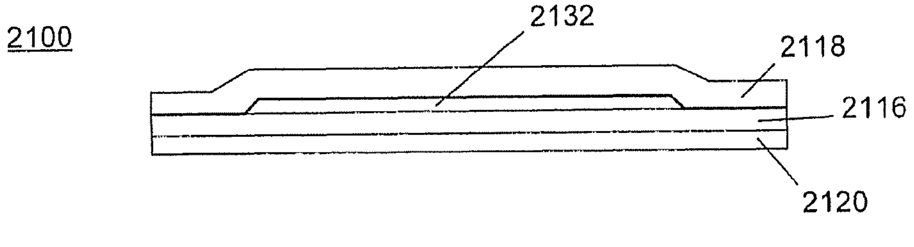
FIG. 21B

DEVICES, SYSTEMS, AND METHODS FOR THE CONTAINMENT AND USE OF LIQUID SOLUTIONS

RELATED APPLICATIONS

This application is a continuation-in-part of U.S. application Ser. No. 11/121,592 filed 4 May 2005 now abandoned, the content of which is incorporated in its entirety by reference. This application is also related to U.S. Provisional Application Ser. No. 60/857,391 filed 7 Nov. 2006, the content of which is incorporated herein in its entirety by reference.

FIELD OF THE DISCLOSURE

The present disclosure generally relates to the single-dose packaging of liquid solutions and substances. Even more particularly, the present disclosure is related to new and improved, single-dose liquid containment devices, which can be used to contain agent, reagent, or control solutions used with physiological or biological test strips and meters.

BACKGROUND OF THE DISCLOSURE

In many medical and laboratory applications, it is necessary to provide or administer a single-dose or an exactly measured dose of a liquid agent, such as medication, reagents, and control solutions for evaluating diagnostic systems. Particularly in laboratory applications and in certain medical applications involving diagnostic tests, reagents are required to be provided in very precise amounts in an assay process. For such purposes, certain agents and reagents are provided in containers or packages which hold only a single dose of liquid or which provide for the delivery of only a single dose from a multi-dose volume of liquid.

One such application in which precise amounts of reagent fluid are required is in the fabrication and patient use of systems for measuring analyte (such as glucose, cholesterol, and narcotics) concentrations in a physiological fluid, such as blood, interstitial fluid, urine, and saliva. Such systems typically include test strips containing a reagent material to which a physiological sample is applied, and meters configured for receiving the test strips and determining the target analyte concentration of the sample on the test strip.

During the manufacturing and fabrication of the test strips, the strips are typically quality control checked by batch sampling methods in which a monitoring agent, often called a control solution, formulated to mimic blood is used to test the accuracy and efficacy of the test strips. Examples of such control solutions are disclosed in U.S. Pat. Nos. 5,187,100 and 5,605,837. The accuracy of test strip meters is also checked during the manufacturing process by using the meter with test strips known to meet quality control standards and having such a control solution applied to them.

Such quality control of test strips and meters is similarly performed directly by the patient or user of such meters and test strips as well as medical personnel treating such a patient. The patient or medical worker is supplied with a control solution, such as when receiving a meter or obtaining a new package of test strips, and is typically instructed to perform a quality control check upon the occurrence of any of the following events: opening a new package of test strips; using a new meter; when training or learning to use the meter and test strips; after the meter is dropped or the like; when the analyte measurement results do not reflect how the patient is currently feeling (e.g., when a glucose measurement result indicates a substantially high level of blood glucose level but the patient is feeling quite normal); or when a glucose measurement result is normal but the patient is feeling sick. Control results which fall outside an expected range may indicate: user procedural error; a dirty meter or test strip container; test strip contamination, deterioration, damage or expiration; meter malfunction; control solution expiration; and/or a control solution which is outside of an acceptable temperature range, etc.

The above-described control solutions are typically packaged in a plastic container or a glass vial. The dispensing end of these containers is typically configured with a small opening at the end of a taper through which a relatively imprecise droplet of control solution can be dispensed by squeezing the bottle. The container holds a volume of liquid control solution, typically having a volume of about 3 to 5 ml, which provides about 100 to 200 dosages which typically lasts about 3 months. To apply the control solution, a cap is removed and the container is tilted so that that its dispensing portion is held several millimeters over a test strip's reagent area. The user then applies a slight squeeze pressure to container to dispense a droplet of the control solution onto the reagent area.

Such a container and the steps for dispensing control solution from the container have their drawbacks. First, the container is repeatedly opened over an extended period of time, thereby repeatedly exposing the control solution to contaminants in the air and on surfaces, such as the user's fingers, which carry contaminants. In addition, because the users of such control solutions often have poor dexterity (such as diabetics), the user frequently fumbles the cap and may drop the cap, which may further contaminate the solution. Such contamination can cause erroneous analyte test results. If it is determined that the control solution has become contaminated the entirety of the control solution must be thrown away, and a new container opened, which can become costly. Moreover, when this happens, a new container of control solution may not be readily available to the user, possibly leaving him or her in a medically risky situation.

Furthermore, such prior art control solution containers are problematic in that, because such a relatively large volume of the control solution is provided, the efficacy of the control solution may expire well before a majority of the control solution is used, which also adds to the cost of treating the patient. The shelf-life of the control solution sealed within its original containment is usually about 1 to 2 years, but once the user opens the solution container, the shelf-life quickly drops to only a few months due to the contamination problem mentioned above. Also, the user may forget to replace the cap on the container causing the control solution to evaporate thereby changing the analyte concentration which results in erroneous values. Additionally, it is difficult to precisely and accurately dispense the requisite volume of the control solution from within such prior art containers. The volume dispensed is highly user dependent in that the user may apply too much control solution by over-squeezing the container or may apply too little solution by not squeezing enough.

There is yet another drawback of prior art control solution dispensers: while advancements are rapidly being made in the development of systems and devices for measuring analyte concentrations, there has been limited advancement in the area of control solution containment and dispensing for use with these advanced systems and devices. In particular, advancements have been made in minimizing the pain experienced by the patient in obtaining a sample of blood or interstitial fluid as well as in minimizing the time and the number of steps necessary to carry out a glucose concentration measurement. The former has been accomplished by reducing both the sample volume size necessary to effect an accurate analyte measurement and the size of the needle for obtaining the sample fluid. The latter has been realized by the integration of various components used for the measurement process. Specifically, microneedles are now being integrated with test strips. In these tester devices, the integrated needle/test strips include a capillary channel which extends from an opening in the distal tip of the microneedle to the sensor reagent area or matrix area within the test strip. Additionally, in certain of these embodiments, the tester is partially dispensed from the meter in an automatic or semi-automatic manner for accessing and collecting the sample fluid, yet remains electrically or photometrically (as the case may be) in contact or engaged with the meter during such fluid access and collection, thereby obviating the need for the user to handle the test strip.

The microneedle configuration clearly saves time and reduces the risk if injury to the patient and contamination to the strip and meter. As such, in a single step, physiological fluid can be accessed (by penetrating the skin with the microneedle), transferring only the minimum amount of sample necessary to the sensor (by means of the capillary channel) and determining the target analyte concentration within the sample (by means of the engaged meter).

In order to evaluate the performance of such an integrated system, the meter is equipped with "on board" diagnostic electronics and software, and a control solution is provided for testing the efficacy of the test strip's sensor. While the prior art control solution dispensers can be used in this case to evaluate the test strips by dispensing a droplet of control solution on to the designated sensor area of the test strip as mentioned above, there is no provision for evaluating the effectiveness of the integrated microneedle. One could deposit a droplet of control solution onto a sterilized substrate and position the microneedle tip within the droplet to evaluate the effectiveness of the capillary channel; however, such requires an additional component and additional steps with a very high risk of contamination of the control solution if the substrate is not adequately sterilized. Even if a sterile substrate can be ensured, there is no means to truly mimic operating conditions wherein the needle is dispensed in a manner to penetrate the skin surface and wick accessed fluid there beneath. More specifically, factors like the needle's ability to penetrate skin at the speed, angle and depth as occurs under actual operating conditions, the needle's tip strength, and the needle's ability to provide suitable capillary action to fluid from within a solid medium, are unable to be evaluated.

As such, there is a need for an improved means of containing and dispensing control solutions and other reagents and agents for single-dose usage. Of particular interest would be the development of a control solution containment device which provides very accurate and repeatable single-doses; prevents against contamination of unused control solution; minimizes the risk of user contact with the dispensed solution; provides a practical number of single-dose units, for example, for a single user over a given time period or for short-term mass use by a large number of users such as in a hospital or clinic; facilitates maximizing the shelf life and efficacy of the control solution; provides quality control assessment of a plurality of aspects of integrated test systems; is easy and convenient to use and store; and is cost effective to manufacture and store.

Of course, such features and advantages may be present in the subject disclosure in varying degrees. It is intended that, in one way or another, the disclosure is of assistance in reducing barriers to patient self-monitoring and therefore result in improved outcomes in the management of disease, such as diabetes.

SUMMARY

The present disclosure includes devices, systems and methods for containing and using liquid solutions. The novel liquid containment devices are for containing single doses of a liquid solution for subsequent use. Packages of such liquid containment devices are also provided. The systems include at least one containment device or package of containment devices and the liquid solution for which they are intended to contain. The liquid solutions may comprise any type of agent, reagent or control solution. The methods involve the use of the liquid containment devices, packages, and systems.

The present disclosure is particularly suitable for use with control solutions used for the periodic evaluation of a system which is used to analyze physiological or biological fluids. The control solutions are chemically configured to mimic the particular fluid for purposes of the evaluation. One particularly suitable application of the present disclosure is in the field of blood glucose determination in both institutional, e.g., clinical or hospital, settings, and for home use by the diabetic patient.

According to one exemplary embodiment of the present disclosure, the containment device has a flexible first layer and a flexible second layer sealed together to form a hermetically sealed reservoir therebetween, wherein the surface area of contact between the first and the second layers define a frame about the perimeter of the reservoir. The containment device also includes a porous pad located within the reservoir, and a liquid control solution configured to mimic a physiological fluid contained within the pad within the reservoir. The pad is made from a material that is non-reactive with the liquid control solution.

Embodiments can present a third layer configured to hold or support the liquid control solution after it has been dispensed from the reservoir, facilitating ease and cleanliness in use.

Among other advantages, and features, the present disclosure provides an improved means of containing and dispensing control solutions and other reagents and agents for single-dose usage. In particular, the containment device of the present disclosure provides very accurate and repeatable single-doses; prevents against contamination of unused control solution; minimizes the risk of user contact with the dispensed solution; provides a practical number of single-dose units, for example, for a single user over a given time period or for short-term mass use by a large number of users such as in a hospital or clinic; facilitates maximizing the shelf life and efficacy of the control solution; provides quality control assessment of a plurality of aspects of integrated test systems; is easy and convenient to use and store; and is cost effective to manufacture and store. Moreover, the containment device of the present disclosure is less likely to allow the control solution to splatter or spill upon the containment device being torn open by a user or being punctured by a microneedle, and the space-filling, inert porous pad provides the advantage that a minimum quantity of solution is necessary to be contained in order to accomplish the intended use.

These and other advantages, and features of the disclosure will become apparent to those persons skilled in the art upon reading the details of the methods and systems of the present disclosure which are more fully described below.

BRIEF DESCRIPTION OF THE FIGURES

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. To facilitate understanding of the description, the same reference numerals have been used (where practical) to designate similar elements that are common to the Figures. Some such numbering has, however, been omitted for the sake of drawing clarity. In the Figures:

FIGS. 21A-21B are a top and side cross-sectional view, respectively, of an alternate embodiment having a third layer and frangible seal area.

Figure 1:
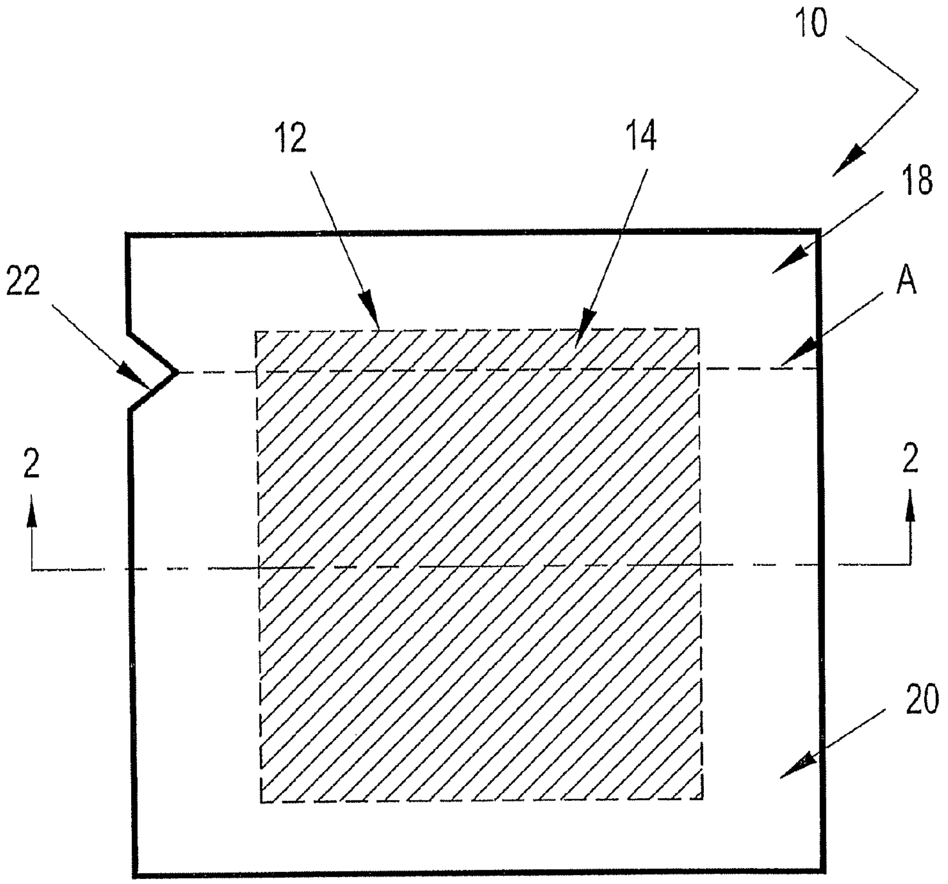
FIGS. 1 and 2 are planar and cross-sectional views, respectively, of an exemplary embodiment of a liquid containment device constructed in accordance with the present disclosure.

One skilled in the art will appreciate that the embodiments depicted in the drawings are illustrative and that variations of those shown, as well as other embodiments described herein, may be envisioned and practiced within the scope of the present disclosure.

DETAILED DESCRIPTION

Referring to FIGS. 1-21B of the drawings, exemplary embodiments of a liquid containment device constructed in accordance with the present disclosure are shown. Each embodiment of the liquid containment device is configured to contain a single dose of a liquid, such as a reagent or control solution, in a sealed, portable format.

The containment device may be provided individually as a singular unit or collectively as part of a pack or package where more than one of the containment devices are contiguous with each other. In certain embodiments the contiguous containment devices are easily separable from each other. Although not shown, the liquid containment device of the present disclosure can be further adapted to be loaded into a dispenser from which the containment devices may be individually or collectively dispensed.

Exemplary embodiments of a liquid containment device according to the present disclosure include three layers: two forming a sealed reservoir for holding the control liquid/solution and the third layer presenting a platform on which dispensed control liquid/solution can be presented to a user.

Figure 2:
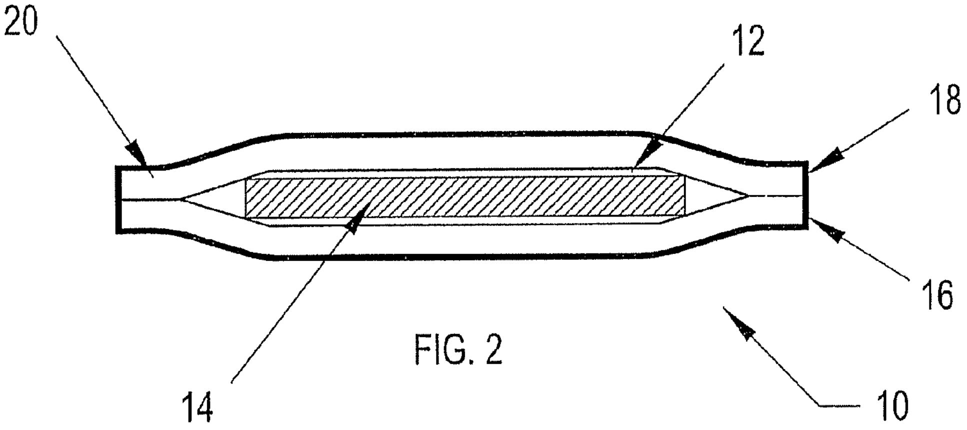

Referring first to FIGS. 1 and 2, a first exemplary embodiment of a liquid containment device 10 of the present disclosure is shown and includes a closed reservoir 12 containing a porous pad 14 holding a single dose of a liquid control solution to be subsequently used.

Depending on the application for which the control solution or other agent is being used, a volume of the reservoir 12 may range from about 100 nL to 200 μL. For control solutions used on test strip sensors for analyte detection and measurement, the reservoir 12 volume typically ranges from about 1 to 20 μL. According to one exemplary embodiment, the opening diameter, width, or length dimensions of the reservoir 12 are in the range from about 1 to 10 mm, and more typically from about 2 to 8 mm, and the depth or thickness of the reservoir 12 are in the range from about 1 to 5 mm, and more typically from about 2 to 3 mm.

The volume of the reservoir 12, which may also be referred to as a cell, compartment, cavity, blister, pouch, or the like, can have any suitable shape. Any appropriate three-dimensional shape may be employed for the reservoir and any appropriate two-dimensional shape may be employed for the cross-sectional area of the reservoir. Suitable three dimensional shapes include, but are not limited to, spheres, ellipsoids, cylinders, cones, and the like. A suitable two-dimensional shape includes, but is not limited to, a square, a rectangle, a triangle, a circle an ellipses, an quadrilateral such as parallelograms, polygons such as pentagons, and the like.

The porous pad 14 contained within the reservoir 12 is made of a material that is inert to the control solution. According to one exemplary embodiment, the porous pad 14 comprises a polyvinyl alcohol (PVA) sponge. PVA is a unique material formalized into a 100% fiber free open-cell structure especially suited for medical and surgical applications. According to another exemplary embodiment, the porous pad 14 comprises a cellulose sponge. The porous pad 14 can be sponge-like, such that when pressure is applied more liquid comes out, or it may be non-compressible. An example of a non-compressible material that may be used for the porous pad 14 is felt. In the exemplary embodiment shown in FIG. 1, the pad 14 is square. However, the pad may be provided in other shapes.

The porous pad 14 acts to occupy volume within the reservoir 12, which reduces the volume of liquid required within the liquid containment device 10. The reduced volume of liquid can substantially lower the cost of each liquid containment device 10, especially for high value solutions. The porous pad 14 does not have to be absorbent, per se, but rather, porous or space-occupying and non-reactive with the liquid containment device 10 or the solution contained within the liquid containment device 10. The porous pad 14 prevents spewing of the control solution when the containment system 10 is opened by tearing, or is penetrated by a needle, and therefore improves the probability of sample collection with a microneedle or other such device. The porous pad 14 also holds the control solution and prevents spilling once the containment system 10 is compromised, either by puncture or by tear. Depending upon the control solution's function, the pad 14 may also be used to filter solids, precisely control the amount of liquid that passes through the pad, and act as a wick when the liquid reservoir is located at the end opposite the application end.

The liquid containment device 10 of FIGS. 1-2 includes two primary layers 16, 18 which are sealed together to define the hermetically sealed liquid reservoir 12. Such a seal is waterproof and maintains a sterile barrier. Both layers 16, 18 are flexible and are penetrable by a microneedle. However, a non-puncturable material may be used on the backside of the package such that the microneedle can only puncture one side and can not penetrate through and pierce a user's hand. The liquid reservoir 12 may be formed or provided exclusively within one of the flexible layers or partially within both layers. In the exemplary embodiment of FIGS. 1 and 2, the liquid reservoir 12 is formed partially within both layers 16, 18.

Materials are used for the flexible layers 16, 18 such that surface areas of contact between the two flexible layers are sufficiently rigid so as to define a frame 20 of the containment device 10. The frame 20 provides sufficient stability to the containment device 10 so that the containment device may be adequately stored, handled and held by a user. The frame 20 also provides a planar surface area extending around the perimeter of the device 10. In the exemplary embodiment of FIGS. 1 and 2, the frame 20 has a square configuration, however any suitable shape may be used including, but not limited to, rectangular, triangular, annular, etc.

The flexible layers 16, 18 are bonded together where they interface to form the frame 20 of the liquid containment device 10. Suitable bonding techniques include heat sealing, radio frequency (RF), or ultrasonic welding. The bond between the two layers must provide a water barrier over the shelf-life of the package. Of course, prior to bonding the two primary layers, the reservoir 12 is filled with the porous pad 14 holding a dose of a selected liquid agent, such as a reagent or a control solution.

According to one exemplary embodiment, the flexible layers 16, 18 of the containment device are made of a water barrier polymer film material in combination with a thin foil material wherein the two are laminated together. Suitable materials include those which are commonly used for pharmaceutical and food packaging applications, such as those disclosed in U.S. Pat. Nos. 4,116,336, 4,769,261, and 6,287,612 which are herein incorporated by reference. The flexible layers each have a desired thickness, e.g., no greater than the penetration length of a microneedle. Thus, in exemplary embodiments, such thickness about 1 mm, and typically in the range from about 0.1 to 0.5 mm.

Control solutions that may be provided in the containment device are comprised in such as way as to have certain properties to mimic the physiological samples which they represent in function. In the example of a control solution for blood glucose meters, the properties include a glucose value, which is measured by the test system and compared against a range of acceptable values. Because the glucose value must fall within a range of acceptable values in order to qualify the test system for further use, it is important the control solution in the containment system be protected from evaporation, since evaporation will change the concentration of glucose in the control solution and cause the control solution to have the wrong glucose value. The inner liner that is in contact with the solution must be nonreactive to the analyte of interest or ingredients that are critical to its functionality. This was demonstrated for partial pressure of oxygen, or oxygen tension, ($pO_2$) in U.S. Pat. No. 6,835,571 to Conlon et. al. These control solutions are used in a variety of environmental conditions and possible by users with limited manual dexterity. Diabetics may choose to carry the control solution with them, so the package needs to be robust yet easily opened without the use of tools (such as scissors). If the meter is not able to be qualified for use because of this defect, the patient may be left in a medically risky situation.

Therefore both the first and the second primary layers 16, 18 of the containment device 10 can include the thin foil material, such as aluminum foil, to act as a barrier against liquid loss by evaporation through the layers. The use of transparent and high barrier foils such as silicon oxides, aluminum oxides, and mixed oxides, or any material with similar gas vapor transmission properties can be used in place of aluminum because some control solutions may require the presence of a gas to stabilize the analyte of interest. The mating, or inner, surfaces of the two layers 16, 18 is comprised of the water barrier polymer film material that is chemically inert to the aluminum foil and chemically inert to the control solution. The polymer can comprise, for example, polyethylene, polypropylene, ethylene vinyl acetate, or ethylene acrylic acid, to name a few. The polymer can be melted with heat and pressure, radio frequency (RF), or ultrasound to form the liquid-tight seal to contain the control solution, and to prevent any reaction between the contained control solution and the aluminum layer. Such a reaction, such as oxidation, will compromise the aluminum layer resulting in excessive loss of liquid, and possibly contaminate the control solution.

Abrasion of the aluminum layer may compromise its effectiveness as a barrier to evaporation, thereby causing the concentration of analyte in the contained control solution to change. The exterior surfaces of the first and second layers 16, 18 of the containment device 10 therefore include a protective coating such as nylon, polyester, Mylar® or Surlyn® to protect the aluminum layer from damage from abrasion which will likely occur during storage, handling and use. This type of material also can be imprinted with necessary labeling information. Alternatively, paper may be provided over the protective coating to allow direct imprint of lot or batch number and expiration date directly on the liquid containment device.

The first and second layers 16, 18 can be provided with different tear strengths, through the use of different materials or different orientation of the same material, for example. In this manner, when the containment device 10 is torn, the exposed inner surface of the first layer 16 is not flush with the second layer 18 so that the exposed inner surface of the first layer 16 can be used as a small, flat sample area that the liquid can pool onto.

In the exemplary embodiment of FIGS. 1 and 2, the containment device 10 is generally square and includes a notch 22 that facilitates tearing of the primary layers 16, 18 so that the porous pad 14 can be accessed. Once accessed and exposed, the pad 14 can be squeezed to release a desired amount of the control solution contained therein. The notch 22 is shaped, positioned, and oriented such that tearing of the primary layers can occur along a straight line, illustrated by line "A" in FIG. 1, that runs parallel with a top edge of the containment device 10, such that an entire top portion of the enclosed porous pad 14 is exposed when the containment device is torn open using the notch 22.

Figure 3:
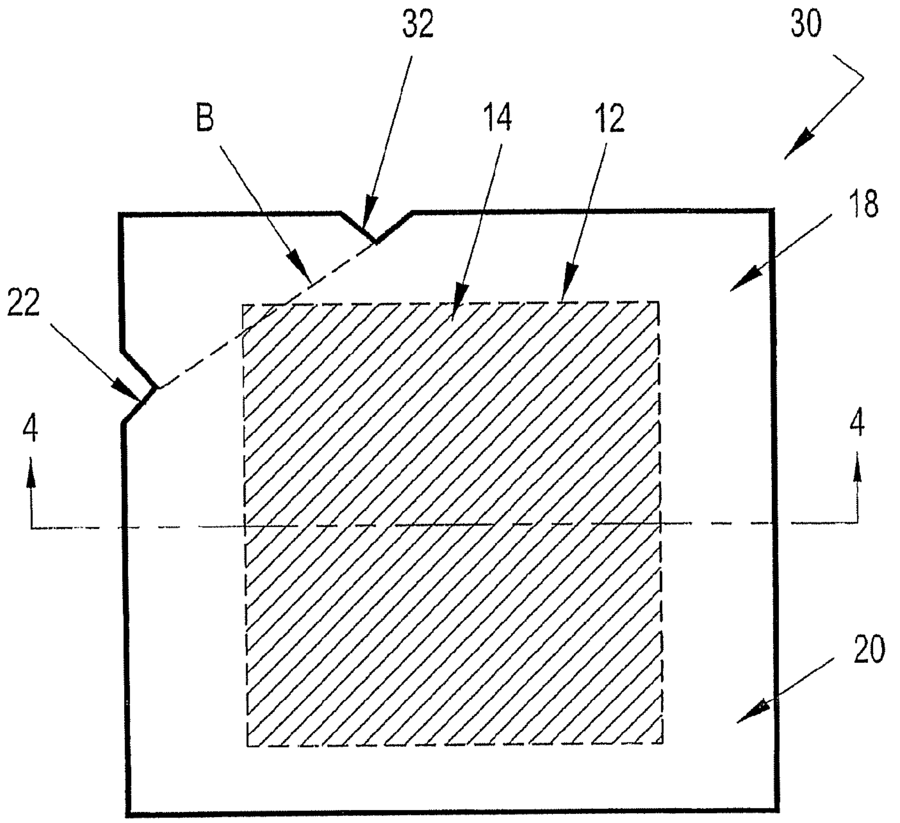
FIGS. 3 and 4 are planar and cross-sectional views, respectively, of another exemplary embodiment of a liquid containment device constructed in accordance with the present disclosure.
Figure 4:
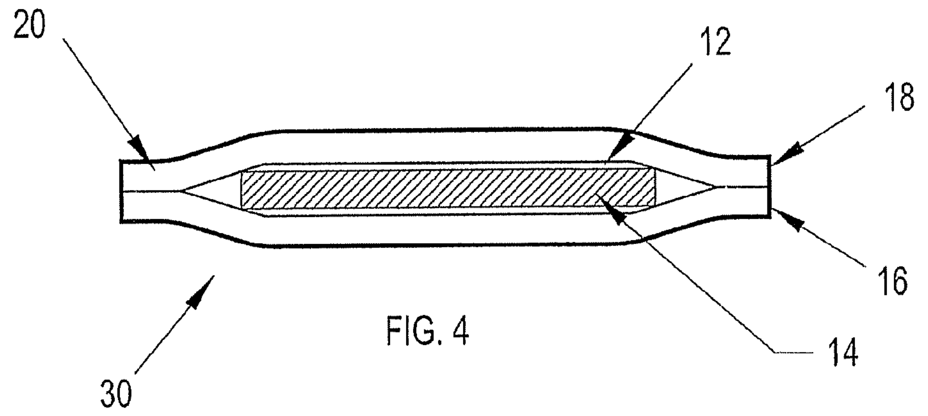

Referring now to FIGS. 3 and 4, another exemplary embodiment of an improved containment device 30 constructed in accordance with the present disclosure is shown. The containment device 30 of FIGS. 3 and 4 is similar to the containment device 10 of FIGS. 1 and 2 such that similar elements have the same reference numeral. The containment device 30 of FIGS. 3 and 4 is generally square and further includes a second notch 32 in addition to the first notch 22. The second notch 32 is positioned with respect to the first notch 22 such that a user is encouraged to tear the primary layers 16, 18 so that only a relatively small portion of a corner of the porous pad 14 is exposed. In particular, the second notch 32 is positioned such that tearing of the primary layers 16, 18 can occur along a straight line, illustrated by line "B" in FIG. 3, that runs between the first notch 22 and the second notch 32 at an angle with a top edge of the containment device 10. In this manner only a small portion, e.g., the corner, of the porous pad 14 is exposed, such that the containment device 14 can be used as a dropper by squeezing the device. The small portion of the porous pad 14 that is exposed can also be used to dab the control solution onto a test strip.

Figure 5:
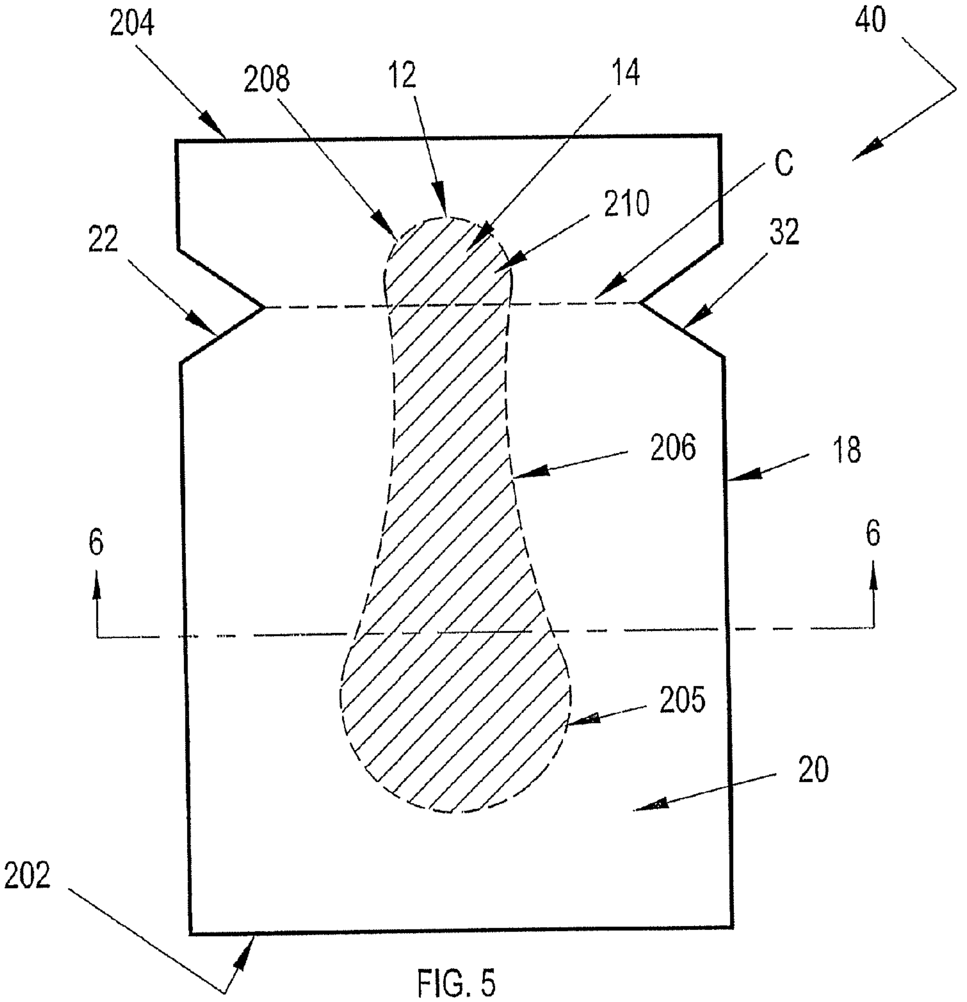
FIGS. 5 and 6 are planar and cross-sectional views, respectively, of an additional exemplary embodiment of a liquid containment device constructed in accordance with the present disclosure.
Figure 6:
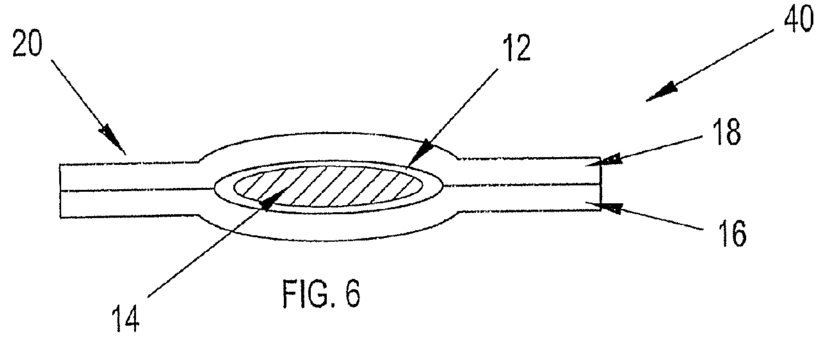

Referring now to FIGS. 5 and 6, a further exemplary embodiment of an improved containment device 40 constructed in accordance with the present disclosure is shown. The containment device 40 of FIGS. 5 and 6 is similar to the containment device 10 of FIGS. 1 and 2 such that similar elements have the same reference numeral. The containment device 40 of FIGS. 5 and 6 has a rectangular shape extending between a bottom end 202 and a top end 204, and the reservoir 12 is provided in the shape of a bottle having a main body 205 and a neck 206 extending upwardly from the main body toward the top end 204 of the containment device to an end, or tip 208. The porous pad 14 is similarly shaped like a bottle and extends from the main body 205 to the tip 208 of the reservoir 12. In addition, the containment device 40 of FIGS. 5 and 6 further includes the second notch 32 in addition to the first notch 22. The second notch 32 is positioned with respect to the first notch 22 such that a user is encouraged to tear the primary layers 16, 18 across the neck 206 of the reservoir 12 so that only an end 210 of the porous pad 14 is exposed. In particular, the second notch 32 is positioned such that tearing of the primary layers 16, 18 can occur along a straight line, illustrated by line "C" in FIG. 5, that runs between the first notch 22 and the second notch 32 parallel with the top edge 204 of the containment device 10. In this manner only a small portion, e.g., the end 210, of the porous pad 14 is exposed, such that the containment device 10 can be used as a dropper by squeezing the device. The small portion 210 of the porous pad 14 that is exposed can also be used to dab the control solution onto a test strip. Although not shown, a graphic representing a more traditional vial may be printed on the exterior of the containment device 10 to facilitate understanding of use (i.e., open the top of the "vial" by tearing, and then pour).

Figure 7:
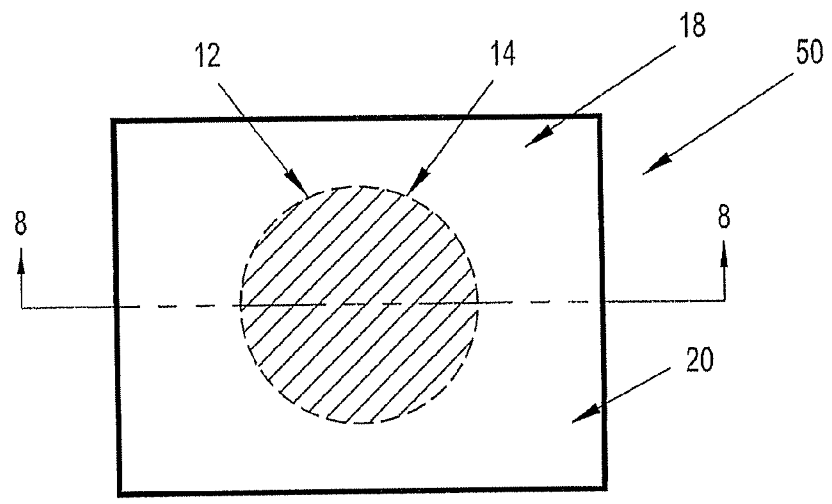
FIGS. 7 and 8 are planar and cross-sectional views, respectively, of another exemplary embodiment of a liquid containment device constructed in accordance with the present disclosure.
Figure 8:
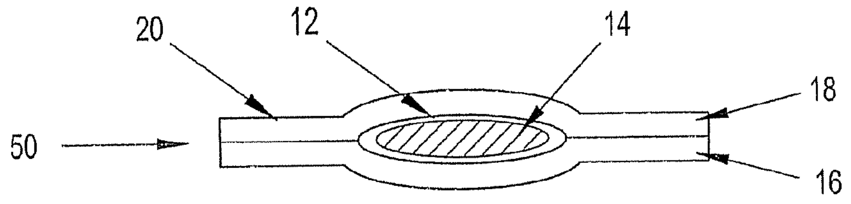
Figure 9:
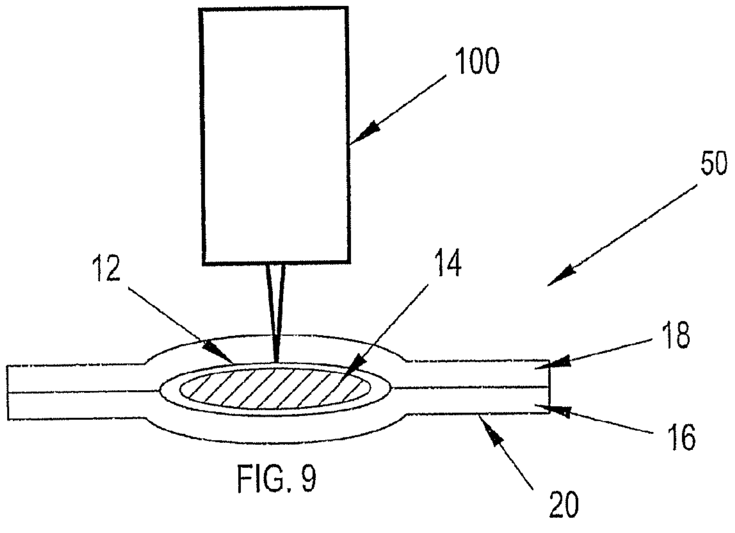
FIG. 9 is a cross-sectional view of the liquid containment device of FIGS. 7 and 8, wherein a microneedle is shown being inserted into the containment device.

Referring to FIGS. 7 and 8, an additional exemplary embodiment of an improved containment device 50 constructed in accordance with the present disclosure is shown. The containment device 50 of FIGS. 7 and 8 is similar to the containment device 10 of FIGS. 1 and 2 such that similar elements have the same reference numeral. The containment device 50 of FIGS. 7 and 8 includes a porous pad 14 this is round and is centered in the device to allow for liquid sampling using a microneedle 100, as is illustrated in FIG. 9. The containment device 50 of FIGS. 7 through 9 does not include a notch for tearing the device, since it is adapted for use with a microneedle. The containment device 50 of FIGS. 7 through 9, however, can be provided with a tear notch, if desired. In addition, the containment device 10 of FIGS. 1 and 2 can be used with a microneedle even though it is provided with a tear notch 22.

Figure 10:
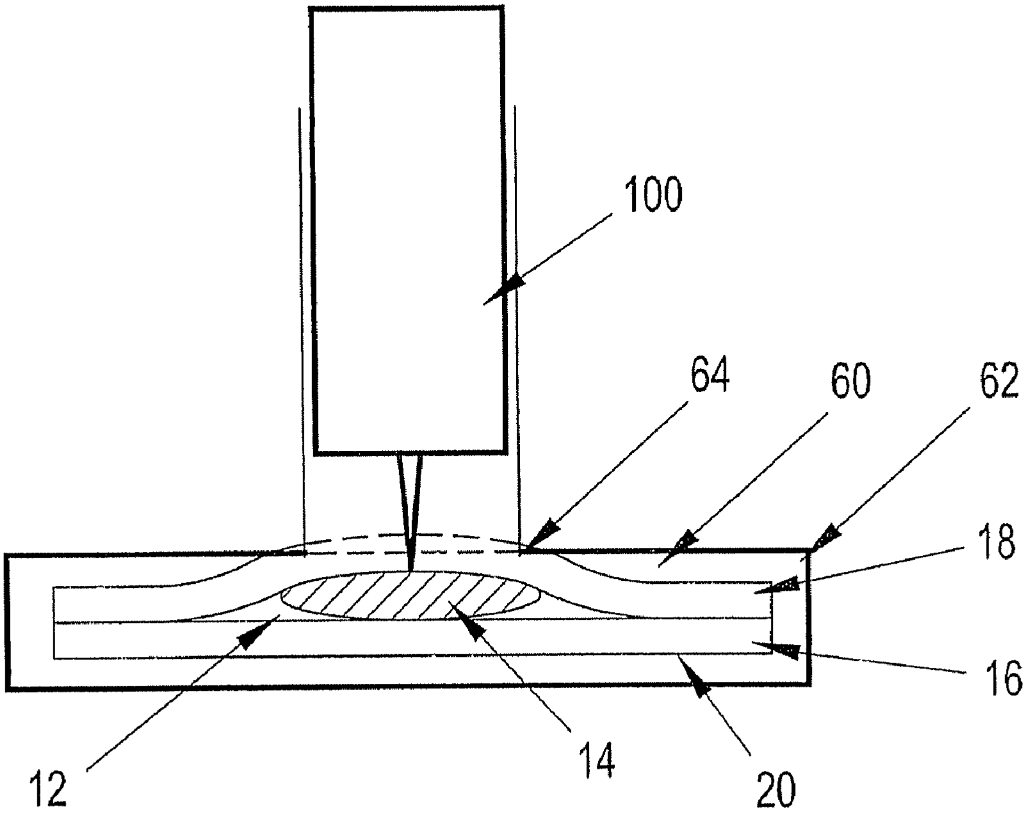
FIG. 10 is a cross-sectional view of another exemplary embodiment of a liquid containment device constructed in accordance with the present disclosure, wherein a microneedle is shown being inserted into the containment device.

FIG. 10 shows a further exemplary embodiment of an improved containment device 60 constructed in accordance with the present disclosure. The containment device 60 of FIG. 10 is similar to the containment device 10 of FIG. 9 such that similar elements have the same reference numeral. The containment device 60 of FIG. 10 is for use with a microneedle 100, as show, and also includes a protective case 62 enclosing the containment device 60. The protective case 62 is rigid and is made of a suitable material such as fiberboard or plastic. The protective case 62 includes an opening 64 over the containment device 60 and in alignment with the porous pad 14, to provide for clear identification of target site and allow for placement of the sampling device (e.g., the microneedle) without additional pressure being applied to the liquid containment device. The protective case 62 provides protection against inadvertent damage to the containment device as well as improves handling of the device, as the users of such control solutions often have poor dexterity and/or vision (such as diabetics). The protective case 62 also provides for the ability to completely eliminate pressure against the containment device while sampling to eliminate liquid spillage during use and to preserve the containment device for use for additional or multiple samples of the liquid.

A first, or bottom, primary layer 16 of the containment device 60 of FIG. 10 may be rigid. Suitable rigid materials include but are not limited to thick foil laminate materials and inert plastics such as those disclosed in U.S. Pat. No. 5,272,093 which is incorporated herein by reference. Examples of such inert plastics include, but are not limited to, polypropylene, polyvinylidine chloride, acrylonitril-butadiene-styrene terpolymer (ABS), high density polyethylene (HDPE), polyvinyl chloride (PVC), etc. The rigid first primary layer 16 may be exclusively made of an inert plastic material or in combination with a foil layer, wherein the two are laminated together.

Figure 11:
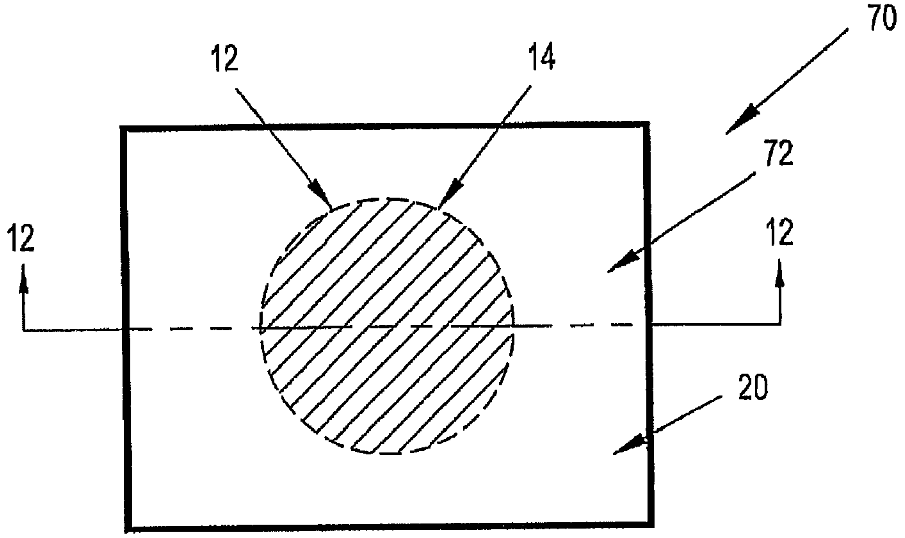
FIGS. 11 and 12 are planar and cross-sectional views, respectively, of a further exemplary embodiment of a liquid containment device constructed in accordance with the present disclosure.
Figure 12:
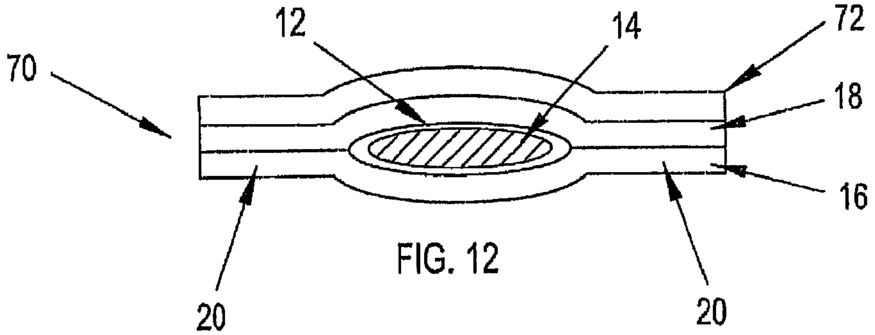
Figure 13:
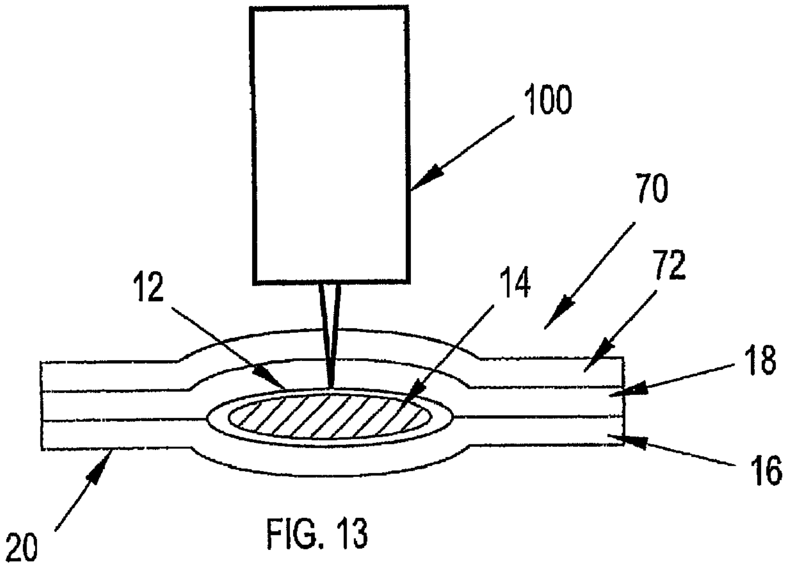
FIG. 13 is a cross-sectional view of the liquid containment device of FIGS. 11 and 12, wherein a microneedle is shown being inserted into the containment device.

FIGS. 11 through 13 show another exemplary embodiment of an improved containment device 70 constructed in accordance with the present disclosure is shown. The containment device 70 of FIGS. 11 through 13 is similar to the containment device 10 of FIGS. 7 through 9 such that similar elements have the same reference numeral. The containment device 70 of FIGS. 11 through 13 includes a porous pad 14 that is round and is centered in the device to allow for liquid sampling using a microneedle 100, as is illustrated in FIG. 13. The first primary layer 16 of the containment device 70 of FIGS. 11 through 13 may be rigid or flexible, as desired.

The containment device 70 further includes a skin-mimicking layer 72 of membrane material composed of non-latex rubber, such as natural rubber, neoprene, Abbathane™, or urethane, positioned over the exterior of the second primary layer. According to one exemplary embodiment the skin-mimicking layer 72 is provided with a thickness of between 0.15 mm and 1.5 mm. The layer 72 has multiple uses. However, as its name implies, in its primary use the skin-mimicking layer 72 is added to mimic human skin in order to further improve the overall presentation of the sample to a meter and blood sampling mechanism of the meter (e.g., a machine driven microneedle). These blood sampling mechanisms may be provided with an 'intelligence' to 'learn' the appropriate depth and force to drive the sampling device through the skin surface to acquire a blood specimen. With the addition of skin-mimicking layer 72, the containment device 70 is given more 'human' characteristic so differences in measurement due to sampling will be reduced or eliminated. The skin-mimicking layer 72 is also self-sealing to allow for multiple punctures, and reuses, of the containment device 70.

Figure 14:
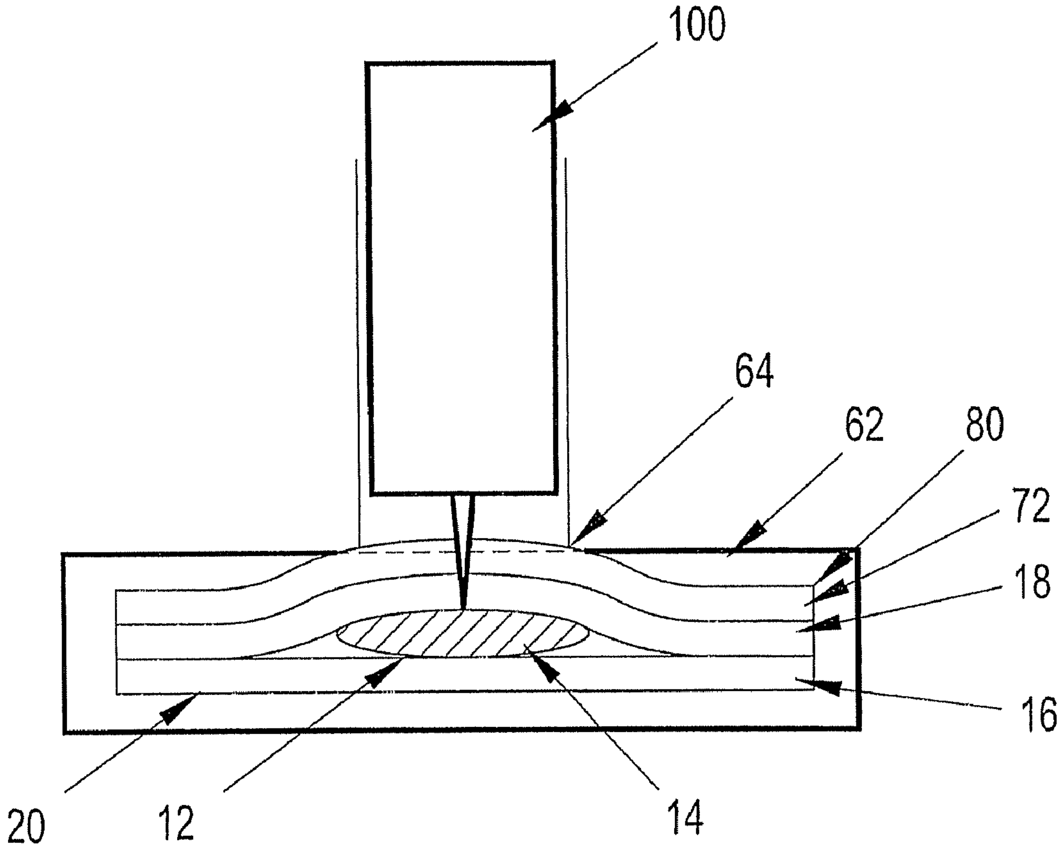
FIG. 14 is a cross-sectional view of an additional exemplary embodiment of a liquid containment device constructed in accordance with the present disclosure, wherein a microneedle is shown being inserted into the containment device.

Referring now to FIG. 14, there is shown another exemplary embodiment of a fluid containment structure 80 constructed in accordance with the present disclosure. The containment device 80 of FIG. 14 is similar to the containment device 70 of FIGS. 11 through 13 such that similar elements have the same reference numeral. The containment device 80 of FIG. 14 also includes a protective case 62 enclosing the containment device 80, similar to the protective case 62 of FIG. 10. The first primary layer 16 of the containment device 80 of FIG. 14 may be rigid or flexible, as desired.

As mentioned above, the liquid containment devices of the present disclosure may be provided collectively as a plurality in a pack form wherein two or more containment devices are provided in a contiguous arrangement. More specifically, the containment devices are provided in a pack where each containment device is contiguous with at least one other containment device such that at least one side of each containment device is contiguous with at least other containment device. While as few as two containment devices may be provided in a pack, typically a greater number is provided in the form of an array of containment devices. Such an array may take the form of a matrix configuration or a strip configuration which may be provided in any suitable size, which size is measured in surface area ($cm^2$) for matrix configurations and in length (cm) for strip configurations. The liquid containment devices in the form of matrix arrays may be provided in relatively large numbers, such as for institutional use, which may be described as a "sheet," or may be provided in relatively small sizes, such as for personal use, which may be described as card-sized to be easily carried on one's person.

For an array of devices in a strip format that is fairly lengthy, the strip may be provided in a rolled form, and even in a wound or spooled form in a dispenser configured similar to dispensers used for adhesive tapes, postage stamps or dental floss where the user may dispense only what he or she needs or desires.

While certain embodiments of the packet of containment devices have a collective, contiguous frame structure which remains intact until all of the doses of control solution are used, other embodiments of the subject packs provide for the intended and easy separation of containment devices from each other. Specifically, perforations or pre-scored lines are formed between adjacent containment devices after the solution-filled containment devices have been sealed as described above. With such embodiments, any number of containment devices may be removed from the contiguous array as needed or desired. For example, a single containment device may be separated from the remaining contiguous plurality just before or just after the use of the control solution in such containment device.

Figure 15:
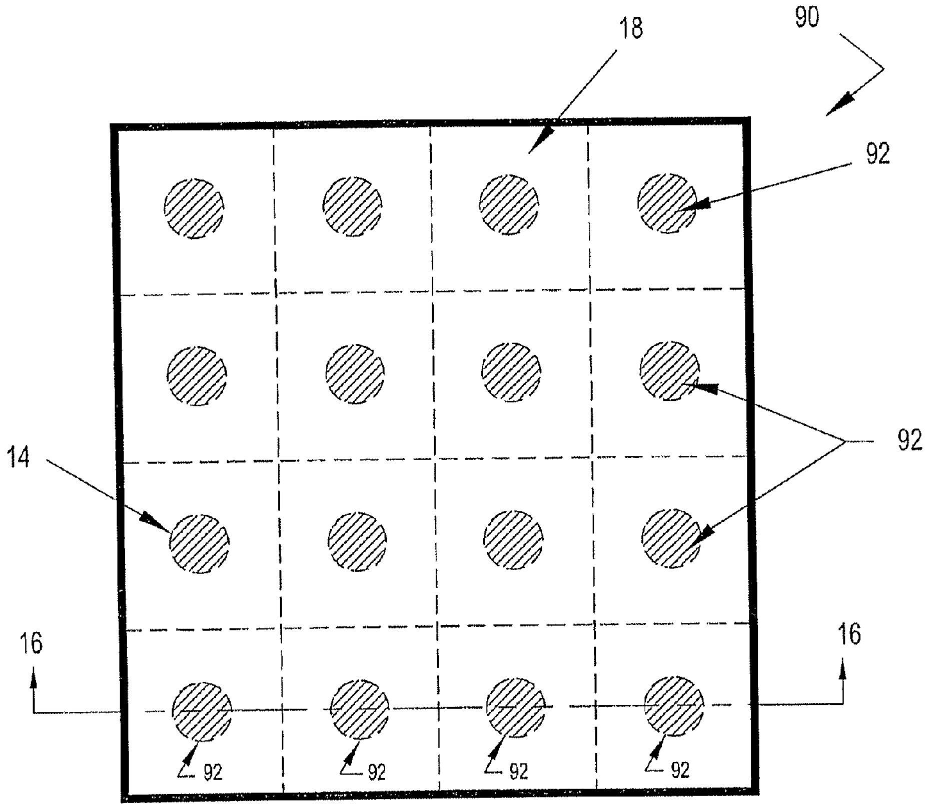
FIGS. 15 and 16 are planar and cross-sectional views, respectively, of a further exemplary embodiment of a liquid containment device constructed in accordance with the present disclosure.
Figure 16:
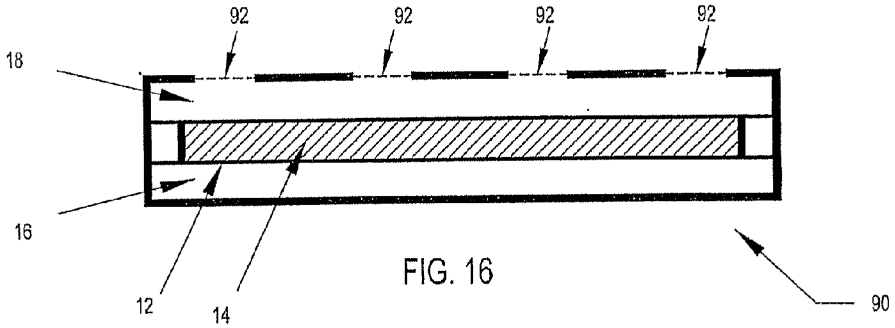

An exemplary embodiment of a multi-use containment device 90 according to the present disclosure is shown in FIGS. 15 and 16. The containment device 90 of FIGS. 15 and 16 is similar to the containment device 10 of FIG. 1 such that similar elements have the same reference numeral. The containment device 90 of FIGS. 15 and 16 is larger and is provided with an array of targets 92 printed or embossed on an exterior surface of one the primary layers 16, 18 to provide for use in high volume testing environments, such as is encountered with quality assurance testing of the sampling devices and/or meters. Each target 92 can be punctured by a microneedle to extract fluid from the porous pad 14.

Figure 17:
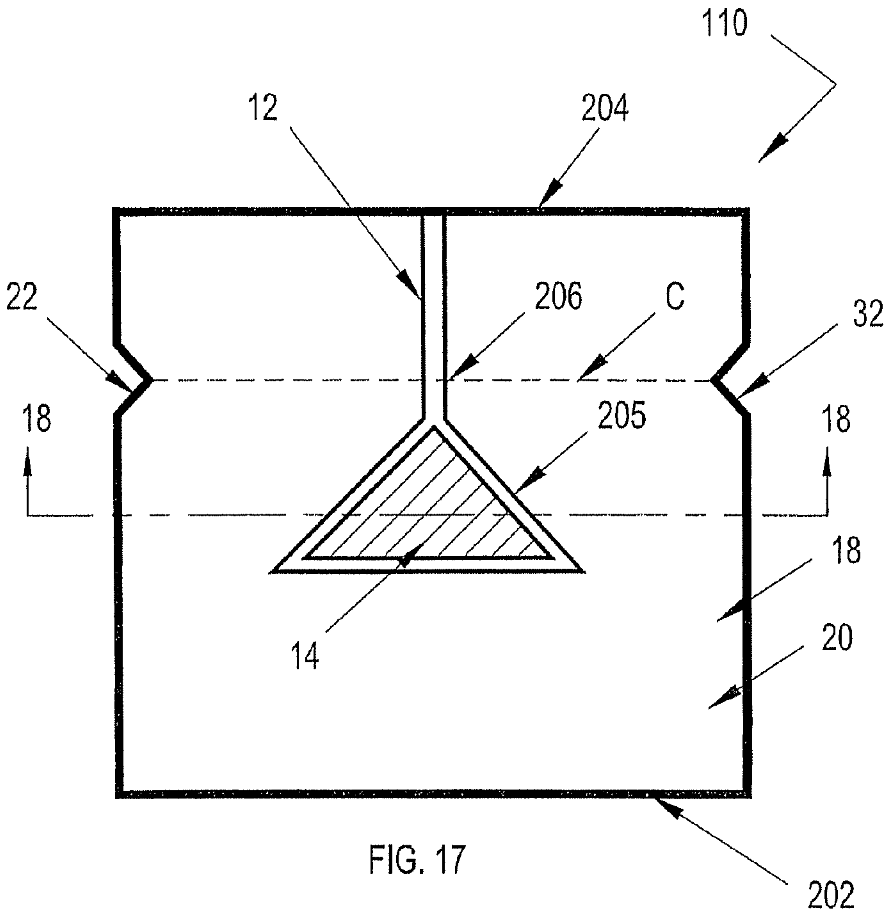
FIGS. 17 and 18 are planar and cross-sectional views, respectively, of another exemplary embodiment of a liquid containment device constructed in accordance with the present disclosure.
Figure 18:
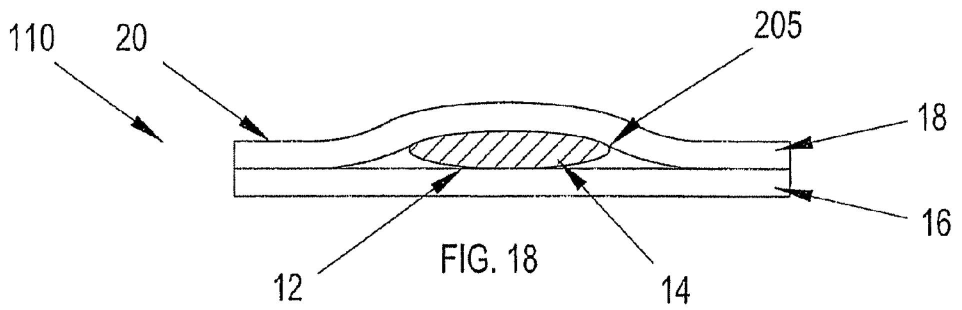

Referring to FIGS. 17 and 18, a further exemplary embodiment of an improved containment device 110 constructed in accordance with the present disclosure is shown. The containment device 110 of FIGS. 17 and 18 is similar to the containment device 40 of FIGS. 5 and 6 such that similar elements have the same reference numeral. The containment device 110 of FIGS. 17 and 18 has a square shape extending between a bottom end 202 and a top end 204, and the reservoir 12 is provided in the general shape of a bottle having main body 205 and a neck 206 extending upwardly to the top end 204 of the containment device 10. The porous pad 14 is shaped and sized to fill only the main body 205 of the reservoir 12. The second notch 32 is positioned with respect to the first notch 22 such that a user is encouraged to tear the primary layers 16, 18 across the neck 206 of the reservoir 12. In particular, the second notch 32 is positioned such that tearing of the primary layers 16, 18 can occur along a straight line, illustrated by line "C" in FIG. 17, that runs between the first notch 22 and the second notch 32 parallel with the top edge 204 of the containment device 10. In this manner only the neck 206 of the reservoir 12 is opened. Although not shown, a graphic representing a more traditional vial may be printed on the exterior of the containment device 10 to facilitate understanding of use (i.e., open the top of the "vial" by tearing, and then pour).

According to one exemplary embodiment, the reservoir 12 of the containment device 110 of FIGS. 17 and 18 is provided with a relatively small volume. The small volume is desirable, for example, for containing costly liquids or if the amount of liquid waste needs to be minimized. The containment device 110 is large enough to grasp (e.g., 2" wide by 3" long), but more than half of the containment device 110 is sealed shut. In addition, the pad 14 is adapted to act as a constriction, so that a metered amount of liquid is dispensed from the neck 206 of the reservoir 12.

As was mentioned previously, embodiments of the present disclosure can present a third layer configured to hold or support the liquid control solution after it has been dispensed from the reservoir, facilitating ease and cleanliness in use. This can be beneficial as in certain circumstances when the packet or containment device with two layers, e.g., 16, 18 of FIG. 1, is torn open, there can be a clear opportunity for the control fluid within to be expelled in an undesired manner. For example, the control fluid can fall onto a table top or the user's clothes, or other such surface causing 1) an unsightly stain and 2) potential loss of the liquid for it's intended use as a control solution.

To address such, exemplary embodiments can include and/or be assembled such that the packet includes a third layer that can be utilized as a liquid holding area, as shown for example in FIGS. 19A-21B; which are not necessarily used in conjunction with a microneedle, but may be optional used with such.

Figure 19A:
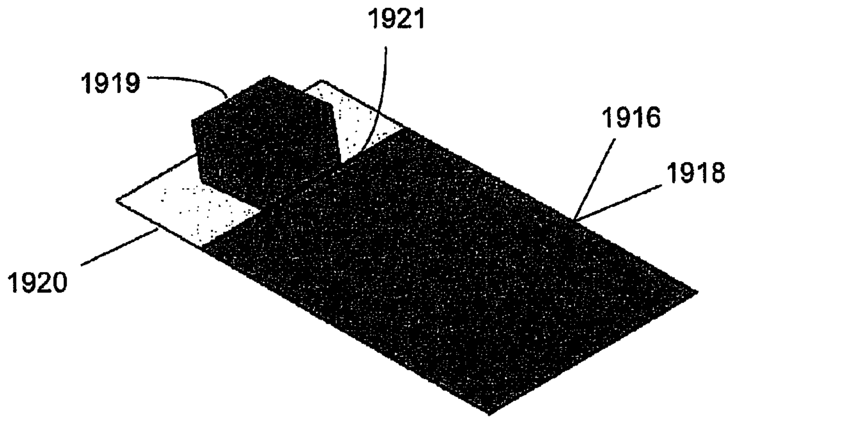
FIGS. 19A-19B are perspective views of an embodiment including a third layer for receiving dispensed liquid.
Figure 19B:
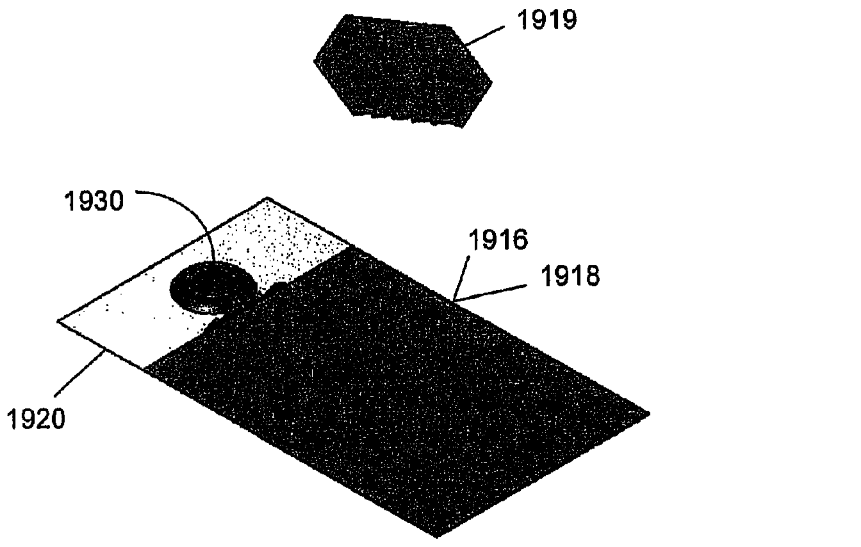

FIGS. 19A-19B are perspective views of an embodiment 1900 including first and second layers 1916 and 1918, similar to FIGS. 1-2, as well as a third layer 1920 for receiving dispensed liquid. The first two layers 1916, 1918 can be sealed to contain a control liquid within, and shaped to present a clear opportunity to tear a cap 1919 off the container. A third layer 1920 can be sealed to the first two layers 1916, 1918 containing the solution and can be utilized to form a tray, layer, or platform on which the control liquid can be dispensed. Because of the presence of the third later, a drop or volume of control liquid can be neatly positioned to allow sampling with a test strip. The third layer 1920 can be made of any suitable material, e.g., foil, paper, card, plastic, etc. FIG. 19B depicts the cap 1919 as having been torn off and a portion of the control fluid/liquid 1930 disposed on the third layer 1920.

Figure 20A:
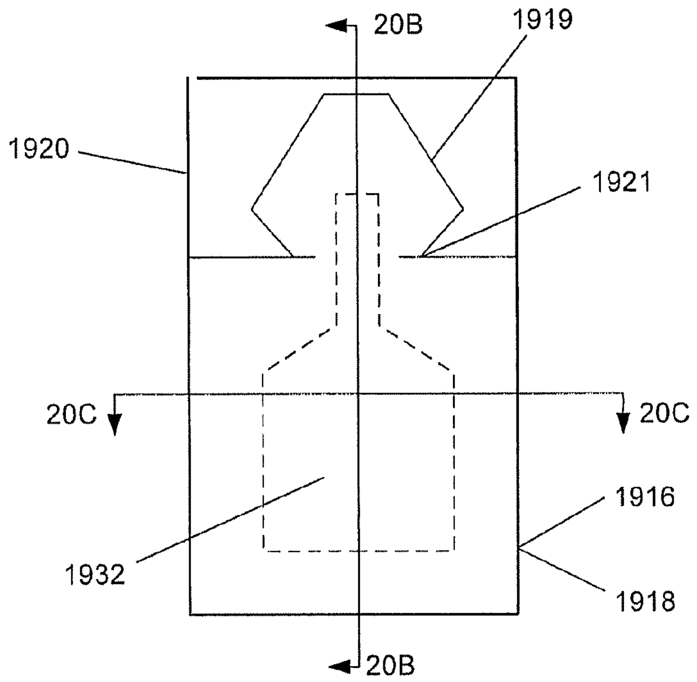
FIGS. 20A-20C are a top view and cross-sectional side and end view, respectively, of the embodiment of FIGS. 19A-19B.
Figure 20B:
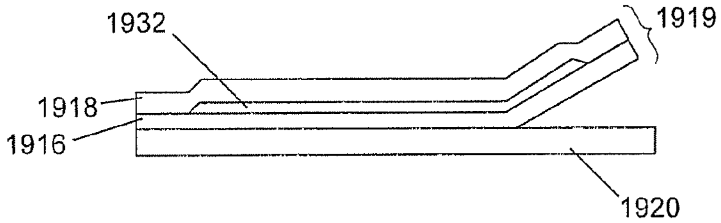
Figure 20C:
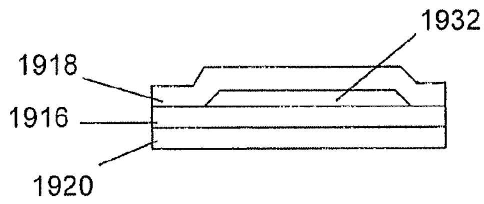

FIGS. 20A-20C are a top, cross-sectional side, and end view, respectively, of the embodiment of FIGS. 19A-19B. As shown in FIG. 20A, the first and second layers 1916 and 1918 can be disposed adjacent and sealed to one another, forming a liquid reservoir 1932 suitable for holding a desired control liquid. A portion of the first and second layers can be shaped as a cap 1919, which along with perforation 1921, can be configured for removal by tearing. Third layer 1920 is shown underlying the first and second layers 1916, 1918 and can be used as a backdrop to hold control fluid upon removal from the reservoir 1932.

As shown in FIG. 20B, which depicts a cross section along cutting line 20B-20B in FIG. 20A, cap 1919 can be pulled away from the third layer 1920, e.g., as when undergoing tearing by a user. FIG. 20C, depicting a cross section along cutting line 20C-20C of FIG. 20A and shows the orientation of the first 1916, second 1918, and third 1920 layers relative to the reservoir 1932.

FIGS. 21A-21B are a top and side cross-sectional view, respectively, of an alternate embodiment having a third layer 2120 including a frangible seal area on one side of perforation line 2121. Cut outs, e.g., denoted by oblique lines 2122*a*-*b*, may be configured in third layer 2120 so that tabs 2124*a*-*b* are presented suitable for holding and tearing by a user. Such tabs 2124*a*-*b*, when accompanied by a tear line 2121, e.g., perforated section, in the first and second layers 2116, 2118 may provide a so-called "frangible" seal to the user.

FIG. 21B depicts the reservoir 2132 in relation to the first 2116, second 2118, and third 2120 layers, respectively.

In exemplary embodiments according to the present disclosure, a system for use in evaluating the performance of a physiological fluid sampling and analyte concentration measurement system can include a liquid containment device or pack, as described above, operatively containing a liquid solution for subsequent use. Such subsequent use can include, but is not limited to, the evaluation of the performance and operation of systems which employ precise amounts or measured single-doses of a liquid. One type of application is in the area of accessing and collecting precise volumes of physiological fluid samples and for analyzing one or more characteristics of the sampled fluid. The subject systems are particularly suited for evaluating the operation of a system for accessing and collecting blood or interstitial fluid samples and for measuring the concentration of one or more analytes of the sampled fluid. The setting of such evaluation may be industrial, e.g., in the manufacturing of such fluid assessment systems, institutional, e.g., in hospitals where such a system is used very frequently, or personal, e.g., for individual who are required to test themselves.

While the present disclosure is described herein in the context of analyte concentration measurement applications, and particularly in the context of glucose concentration in blood or interstitial fluid, such is not intended to be limiting and those skilled in the art will appreciate that the disclosed devices, systems and methods are useful in the measurement of other physical and chemical characteristics, e.g., blood coagulation time, blood cholesterol level, the existence of legal or illegal drugs, etc. of other biological substances, e.g., urine, saliva, etc., involving the use of a reagent. Likewise, the devices, systems and methods of the present disclosure are useful in applications using other types of substances or agents which require the convenient provision of a precise dose of such substances or agents As there are dozens of types of liquids used in various types of applications and settings, it is beyond the scope of this disclosure to list all possible liquids that may be used with the systems of the present disclosure. However, the subject systems may be used in any applications requiring single-doses of a liquid for frequent or infrequent use. For purposes of describing the subject methods below, the liquid provided by the subject systems is a control solution for the performance evaluation of a system for measuring analyte concentration in a sample of physiological fluid. Examples of such control solutions are disclosed in U.S. Pat. Nos. 5,187,100 and 5,605,837.

Exemplary embodiments of methods according to the present disclosure are described with respect to the use of the containment device containing a control solution for checking the effectiveness and operation of an analyte concentration measurement system as described above, which system includes an integrated microneedle and test strip sensor and a meter for use with such microneedle/test strip. However, it is understood that the methods apply to any suitable liquid containment device and liquid containment pack of the present disclosure.

The method embodiments can initially involve providing at least one containment device, either in singulated form or in a pack format. If in a pack format, a target containment device is selected for the plurality of devices. The target containment device may be separated or singulated from the pack prior to performing the remainder of the steps, or may be left intact with the remainder of the pack during the analyte measurement procedure and then removed after the procedure has been completed. Alternatively, the used target or selected containment device may be left intact with the pack and disposed of collectively with the remainder of the containment devices, also kept intact on the pack, until all devices have been used.

Exemplary method embodiments are now described with respect to the containment device of FIGS. 7 through 9. The at least one containment device 10 having a reservoir 12 filled with control solution may be placed on a level surface or manually held by the user with one of the flexible layers exposed. The tester to be evaluated or a tester for use with a meter to be evaluated is then provided. Although not shown, tester includes a test strip having a sensor portion, and a microneedle integrated at the distal end of test strip. A fluid transfer channel extends from the microneedle to within the sensor. Preferably, tester is provided operatively loaded within a meter (not shown) for the control check; however, the tester may be manually held and then inserted into the meter after collection of a dose of control solution. The meter is operatively held and juxtaposed against flexible surface of the containment device 10. The meter is then activated to operatively dispense tester which action causes the microneedle to puncture or penetrate through flexible surface or layer into the reservoir a predetermined depth, which depth is sufficient to expose the distal end of channel to the control solution within reservoir 12. The channel then wicks the control solution from within the containment device 10 and transfers it into the sensor portion of the tester where it reacts with the redox reagent system within the sensor's electrochemical cell. The signal produced by this reaction is detected by the meter's electronics and the corresponding analyte concentration value is displayed.

If the analyte concentration results fall outside an expected range (often provided with the instructions of use packaged with the testers or test strips), the control test should be repeated with an unused tester. If the results still fall outside the expected range, the test should be repeated yet a third time but with a tester from a new package of testers. If the third result is outside the expected range, it is likely that there is a problem with the meter, and the user should notify the manufacturer of the problem and request a replacement meter. In addition to control checking the performance of the tester and the meter, the microneedle's effectiveness in puncturing the containment device may also be evaluated.

Also provided by the present disclosure are kits for practicing the subject methods. The kits include at least one liquid containment device containing a selected liquid solution, but typically include a plurality of containment devices packaged together in a the form of a sheet, card or roll, each containing the selected liquid solution. The kits may further include a disposable or reusable containment device dispenser. The containment device(s) contain a control solution selected for the particular application at hand, such as a control solution which mimics blood for evaluating the performance of integrated microneedle/testers and the meter for use therewith. Finally, the kits may include instructions for using the containment devices for control checking or evaluating the performance of the testers and meters described above. These instructions may be present on one or more of the packaging, a label insert, and the like.

The foregoing disclosure has been described in some detail by way of illustration and example for purposes of clarity of understanding. It is to be understood, however, that this disclosure is not limited to particular variations set forth herein, as various changes or modifications may be made to the disclosure described, and equivalents may be substituted, without departing from the true spirit and scope of the disclosure. In addition, it is readily apparent to those of ordinary skill in the art in light of the teachings of this disclosure that certain changes and modifications may be made thereto without departing from the spirit or scope of the appended claims.

What is claimed is:

1. A liquid containment system for use with an analyte concentration measuring system including a fluid-accepting test strip, the liquid containment system comprising:

at least one containment device including, a first flexible layer and a second flexible layer sealed together to form a hermetically sealed reservoir therebetween, wherein the reservoir includes a liquid control solution that is configured to mimic a physiological fluid, wherein the first and second flexible layers include a tearable portion extending from a first notch to a second notch both formed within the first and second flexible layers and defining a tear line between a first and second portion of the reservoir, and wherein the hermetically sealed reservoir has a volume equivalent to a single dose in the form of a single drop of the control solution upon tearing of the tearable portion; and a third flexible layer fixedly disposed against the first or second flexible layers and adjacent to one or both of the first and second reservoir portions and configured and arranged to present a platform for receiving the single drop of the control solution and to present the single drop to the fluid-accepting test strip upon tearing of the tearable portion of the first and second flexible layers.

2. The system of claim 1, further comprising a porous pad disposed within the reservoir.

3. The system of claim 2, wherein the porous pad comprises a polyvinyl alcohol (PVA) sponge.

4. The system of claim 2, wherein the second notch is positioned with respect to the first notch such that tearing the layers along the tear line between the notches exposes only a small portion of the porous pad.

5. The system of claim 4, wherein the single dose has a volume of between about 100 nL to 200 μl.

6. The system of claim 2, wherein the first and second flexible layers have a rectangular shape extending between a bottom end and a top end, and the porous pad has a bottle shape with a neck extending upwardly toward the top end of the containment device to a tip, and the first and second notches are positioned such that tearing the layers along the tear line between the notches exposes only the tip of the porous pad.

7. The system of claim 1, wherein the first and second layers each include a perforated portion.

8. The system of claim 1, wherein the liquid control solution comprises a single dose.

9. The system of claim 1, wherein at least one of the first and the second flexible layers comprise a polymer film and metal foil.

10. The system of claim 1, wherein the first layer and the second layer have a thickness between about 0.1 to 0.5 mm.

11. The system of claim 1, wherein the first and the second flexible layers each comprises an inner polymer film, an outer protective coating, and metal foil positioned between the inner polymer film and the outer protective coating.

12. The system of claim 1, wherein the third flexible layers comprises a polymer film and metal foil.

13. The system of claim 1, wherein the third layer has a thickness between about 0.1 to 0.5 mm.

14. The system of claim 1, wherein the third flexible layer comprises an inner polymer film, an outer protective coating, and metal foil positioned between the inner polymer film and the outer protective coating.

15. A liquid containment device adapted for use with an analyte concentration measuring system including a test strip, the device comprising:

a first flexible layer and a second flexible layer sealed together along a seal to form a hermetically sealed reservoir therebetween, wherein the seal includes a frangible seal portion including a first notch in the first layer and a second notch in the first layer, wherein the frangible seal portion is configured to be torn by a user along a tear line in the first layer from the first notch to the second notch; and a liquid control solution that is configured to mimic a physiological fluid contained within the reservoir in a volume equivalent to a single drop of the control solution;

wherein the second flexible layer is configured and arranged to present a clean platform for receiving the single drop of the control solution and adapted to present the single drop of control solution to the test strip upon tearing of the frangible seal portion of the first flexible layer.

16. The containment device of claim 15, further comprising a porous pad located within the reservoir.

17. The containment device of claim 16, wherein the second notch is positioned with respect to the first notch such that tearing the first layer in a straight line between the notches exposes only a small portion of the porous pad.

18. The containment device of claim 16, further comprising a rigid protective case enclosing the containment device, and including an opening over the containment device and in alignment with the porous pad.

19. The containment device of claim 15, wherein the reservoir defined by the sealed flexible layers has a bottle shape with a neck extending toward one end of the containment device to a tip, and the tear line crosses the neck of the bottle shape.

20. The containment device of claim 15, further comprising a skin-mimicking layer of membrane material positioned over the exterior of one of the first and second layers.

21. The containment device of claim 20, wherein the skin-mimicking layer comprises a non-latex rubber.

22. The containment device of claim 20, wherein the skin-mimicking layer has a thickness of between 0.15 mm and 1.5 mm.

23. The containment device of claim 20, wherein the skin-mimicking layer is self-sealing.

* * * * *